(12) United States Patent
Heger

(10) Patent No.: US 6,220,709 B1
(45) Date of Patent: Apr. 24, 2001

(54) PROJECTION SYSTEM, IN PARTICULAR FOR THREE DIMENSIONAL REPRESENTATIONS ON A VIEWING DEVICE

(75) Inventor: Atilla Heger, Dusseldorf (DE)

(73) Assignee: Helmut Tan (DE)

( * ) Notice: Subject to any disclaimer, the term of this patent is extended or adjusted under 35 U.S.C. 154(b) by 0 days.

(21) Appl. No.: 09/284,058

(22) PCT Filed: Sep. 30, 1997

(86) PCT No.: PCT/DE97/02246

§ 371 Date: Apr. 6, 1999

§ 102(e) Date: Apr. 6, 1999

(87) PCT Pub. No.: WO98/15869

PCT Pub. Date: Apr. 16, 1998

(30) Foreign Application Priority Data

Oct. 9, 1996 (DE) .............................................. 196 41 480

(51) Int. Cl.[7] .................................................. G03B 21/14
(52) U.S. Cl. .................................................. 353/8; 359/464
(58) Field of Search ....................... 353/7, 8, 10; 359/458, 359/451, 478, 464, 465, 477; 348/51, 52, 53, 55, 56, 57

(56) References Cited

U.S. PATENT DOCUMENTS 4,879,603   11/1989   Berman .

FOREIGN PATENT DOCUMENTS

| 3303739 A1 | 8/1984 | (DE) . |
|---|---|---|
| 4309667 A1 | 9/1994 | (DE) . |
| 19611077 A1 | 9/1996 | (DE) . |
| 03089794 | 4/1991 | (EP) . |
| 0 656 555 A1 | 6/1995 | (EP) . |
| WO 90/03086 | 3/1990 | (WO) . |
| WO 94/04956 | 3/1994 | (WO) . |
| WO 94/14104 | 6/1994 | (WO) . |

Primary Examiner—William Dowling
(74) Attorney, Agent, or Firm—Thomas C. Feix

(57) ABSTRACT

The present invention relates to a projection system especially intended for projecting three-dimensional representations on a viewing device (8, 12), where the representations submitted to the watcher's eye are put in relation with the respective point where the watcher stands (6,7), to whom sensors are allocated for locating his or her relative position, so that he or she sees on the viewing device an image virtually represented in space in relation to his or her position. In order to allow for the various three-dimensional representations to be viewed by many watchers on the same viewing device, the system projects several image representations simultaneously, each corresponding to the watcher's relative position. Each watcher is allocated image separating apparatus which enable his or her access to image representations corresponding to the place where he or she stands. With the inventive system a projection of virtual objects is obtained which is close to a holographic representation, including in a stereoscopic representation.

24 Claims, 3 Drawing Sheets

Figure 1:
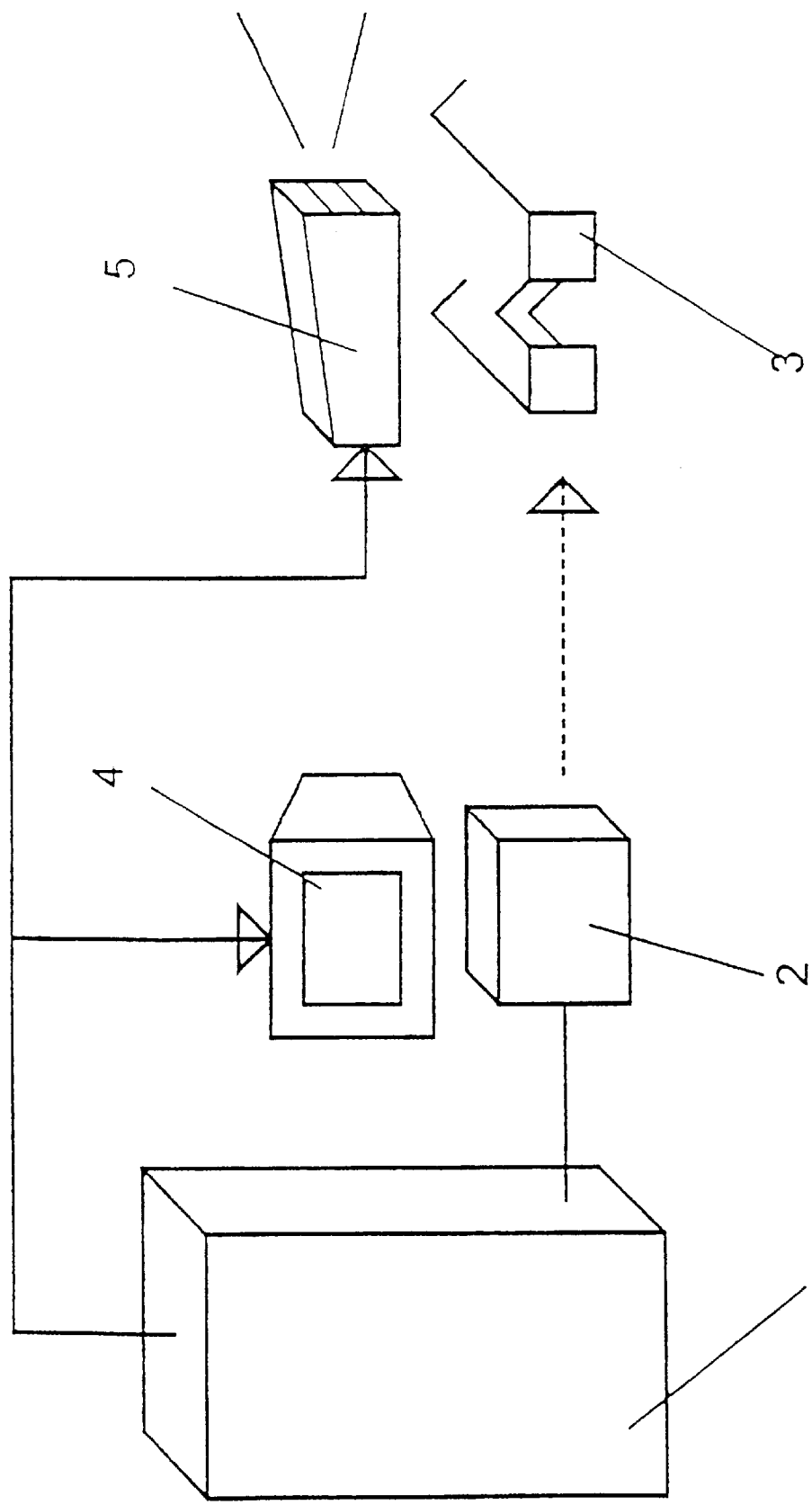

PROJECTION SYSTEM, IN PARTICULAR FOR THREE DIMENSIONAL REPRESENTATIONS ON A VIEWING DEVICE

The invention has to do with a system for projecting pictorial representations, in particular 3D images, onto a viewing device in accordance with the general description given in claim 1.

Three-dimensional objects are frequently represented on a viewing device as two-dimensional images, for which the viewing angle and position of the viewer relative to the stationary projection screen determine the aspect of the object presented by the image at a particular time. This requires that the location of the viewer relative to the screen be ascertained in spatial coordinates by appropriate sensors, and that the representation on the screen be suitably calculated and adjusted by an appropriate tracking system. When such a procedure is employed, and when a single projection screen is used, only one viewer at a time can see a representation of the object on the screen corresponding to that viewer's position; other viewers see a distorted image.

With a different procedure for viewing an object that is virtually stationary in space, one projection screen is assigned to a particular viewer, and remains so assigned for the duration of the viewing. The position of the viewer at any given time is registered by the tracking system, and anytime the viewer's position changes, the representation of the object is calculated and displayed afresh in real time as a function of the location and the viewing angle of the viewer. Such a system generally employs a helmet having viewing devices which are placed in direct relationship with the viewer's eyes, e.g., a LCD screen. However, such helmets are unwieldy and moreover can be used only by a single viewer. Furthermore, the viewer's natural environment cannot easily be included in the representation provided by such a helmet. When this kind of procedure is employed, though, the tracking system can also analyze the screen's position and the direction in which the screen is presenting the image, making a helmet unnecessary. There is still only a single representation on the screen, however.

A true stereoscopic projection makes possible more detailed views of spatial relationships. For example, forms and shaped parts, or working parts, can be represented in detail with lights and shadows. When it is a matter of a real-time representation that is derived from a computer, the visual appearance of the object can be directly modified.

To achieve a true stereoscopic representation of an image by projection onto a canvas projection screen or by display on a video projection screen, in the main two procedures are used that require employment of spectacles whose lenses function as image separators and which make it possible to make different image data available to the right eye and to the left eye.

In the case of the passive procedure, the lenses of the spectacles are polarized differently; for example, at an angle of 90° to each other or circularly in opposite directions. The image shown on the canvas projection screen must be polarized in a corresponding fashion. This can be achieved, for example, by using projectors having polarization orientations that are different for the right and the left representation of the object.

For the active procedure, no polarization filters are required. Instead, the separation of the images is effected by means of sequential representation of the image data assigned to the left and the right eye. Through a synchronous tracking system, LC spectacles (shutter-lens spectacles) are switched over in the same rhythm so that the viewer can perceive with each eye only the image information assigned to that eye. The clock-pulse frequency of the switching determines the degree to which the viewer sees a flickering.

With regard to both the passive and the active forms of this technique, one or several persons can apprehend at the same time only the same information. If, for example, stereoscopic representations of work routines and operations are wanted, in order to convey to the viewer a stereoscopic image of a certain phase space coordinated with the viewer's physical location, and if it is also desired that the phase space coordinated with a second person's position be shown to this second person, and if the two images of the phase space are different, then it is undesirable that the same 3D image be shown to both viewers.

A representation of an object corresponding to its natural appearance, and one that allows several viewers to perceive different aspects of the object, can be achieved at the present time only with a holographic representation. A real-time representation of objects of considerable size, e.g., of an automobile, that permits modification of the object, is not yet possible, however, and does not appear to be even conceivable in the foreseeable future.

A system for displaying two different images in the form of 2D representations on a single viewing device is known from U.S. Pat. No. 4,879,603. The displays for separate viewers are separated from one another by image-separating devices consisting of circular polarizers. The resulting image is not a stereoscopic one.

EP-A-O 656 555 presents a projection system for 3D representations that enables a viewer to see a 3D image. In this system, two projection screens are used which effect a right/left separation by means of a system of mirrors. These two 3D images are separated in a manner taking into account the viewer's position. This is done by using extraordinarily complicated lighting devices or lenticular assemblies. Each stereoscopic image is coordinated with just one single position (which can be changed only slightly), which can be occupied by only a single viewer at a time.

The invention is intended to provide a system for projecting non-holographic 3D representations, in particular stereoscopic images, onto a viewing device, with the aid of which system the simultaneous representation of different image contents, approximating a holographic representation, for several viewers is possible, This purpose is fulfilled by the invention described in claim 1. Modified forms of the invention offering advantages are described in sub-claims.

The invention consists of a system for projecting non-holographic 3D images onto a viewing device. In this system, the images assigned to the viewer's eyes are brought into relationship with the viewer's position at a particular time by sensors which are assigned to the viewer, and which ascertain the viewer's position at a given time, and by the display on the viewing device of an object whose virtual spatial positioning corresponds to the viewer's standpoint. For the purpose of simultaneous perception of different 3D images on the same viewing device by several viewers, several different images that are coordinated with the various locations of the viewers are displayed simultaneously. Image-separating devices are assigned to the several viewers, by means of which each viewer has access only to the images that are coordinated with that particular viewer's position. For stereoscopic viewing of the object, two 3D images, which are separated by image separators and assigned to a viewer's right and left eyes, are provided to each viewer.

With the aid of the system in question, it is possible for a number of viewers to view an object on the viewing device from different positions simultaneously, with the viewing angle of each person corresponding to the actual viewing angle of the virtually stationary object. It is therefore possible for one person to view a certain aspect of the object, while at the same time another person is seeing a different detail of the object.

The images assigned to the several viewers can be displayed sequentially in time. The image-separating devices are in that case shutter-lens spectacles that are synchronized with the images; the shutter lenses of a particular viewer allow passage of the projected light only when the image assigned to that particular viewer is displayed.

In an alternate embodiment of the invention, the images assigned to the several viewers are displayed simultaneously, but are polarized differently on the projection screens. In this case, the image-separating devices are spectacles with polarization lenses which permit passage only of the images corresponding to their polarization orientation and to the particular viewer's standpoint.

To accomplish a stereoscopic projection, images that are separated by image separators are supplied as assigned to the left and the right eyes of the viewers.

If shutter-lens spectacles are used for the stereoscopic projection, it is preferable that the length of time during which the pertinent shutter lenses of a viewer are switched to allow passage of light for each eye within a period of the clock-pulse frequency, be shortened in proportion to the number of viewers, or that the clock-pulse frequency of the representation be increased in proportion to the number of viewers, so that the flickering does not become stronger due to the intervals of the temporal sequence in which the representation occurs.

If the system of projection of stereoscopic 3D images is employed for two viewers, they are then able to perceive the image data assigned [to each of them] simultaneously, but each perceives only the data assigned to him. This makes it possible, for example, to visualize production operations that are carried out jointly considerably better than is possible when it is a matter of an image produced by a single stereoscopic projection.

The system provided for by the invention can be employed very advantageously for the projection or representation of 3D-image data on a computer-controlled screen or for a projection device that is controlled by computers.

A single projection device can be used that projects the different images successively. Alternatively, a system can be used in which a separate projection device is assigned to each viewer. When the system provided for by the invention is used with two viewers and with stereoscopic projection, four alternative image sequences can be employed. The selection of the particular sequence depends on which particular image is to be shown, inasmuch as the crosstalk between the different channels must be taken into account, as well as on which kind of shutter lenses are being used and which kind of projection technology is being applied.

In a preferred embodiment of the invention, the means of separating the right- and the left-eye information for the individual viewers are polarization orientations, and the means used to separate the images viewed among the various viewers are shutter configurations. The assignment [of these means] can also be the reverse.

Linearly or circularly polarized filters on appropriately equipped projectors, for example, can be used as polarization devices. Then the first viewer or the first group of viewers is given shutter lenses with the first polarization orientation, and the second viewer of group of viewers is given shutter lenses with the second polarization orientation. Possible loss of light due to the polarization filters can be compensated for by using several projectors for each individual viewer or each group of viewers.

It is preferable that the projection surface be a cylindrical screen within which the object to be viewed is virtually situated in a stable manner. Should from-above or from-below information be desired, there is a further-developed embodiment of the invention employing a spherically shaped projection surface within which the object is virtually fixed in place. In both cases, the projection screens are illuminated from within. Thus a viewer located outside of the projection assembly experiences the illusion that the object being viewed is situated within the space enclosed by the projection surface. In the case of a stereoscopic projection, the object can therefore be seen as intersecting the projection surface, depending on the adjustment of the stereoscopic apparent window.

The system provided for by the invention allows the viewing of objects, even those of considerable size, in the manner of a holographic representation. The represented objects can be the photographically realistic representations of an object; they can, however, also be computer-generated graphics, the shape of which can be altered interactively. Applications of this kind can be used especially in the construction and design of machine parts, automobile parts, and other products. When a cylindrical or spherical projection surface is employed, the viewers can move around the object in a circular path. Alternatively, the same effect can be achieved by virtually rotating the object while the viewer remains stationary. In this case no tracking system is necessary.

When a cylindrical or spherical projection surface is used, the represented object can be displayed seamlessly and in a homogeneous fashion. To achieve such a display, well-established image-processing procedures used to improve edges can be employed to avoid, for example, the appearance of edges on adjacent images.

Figure 2:
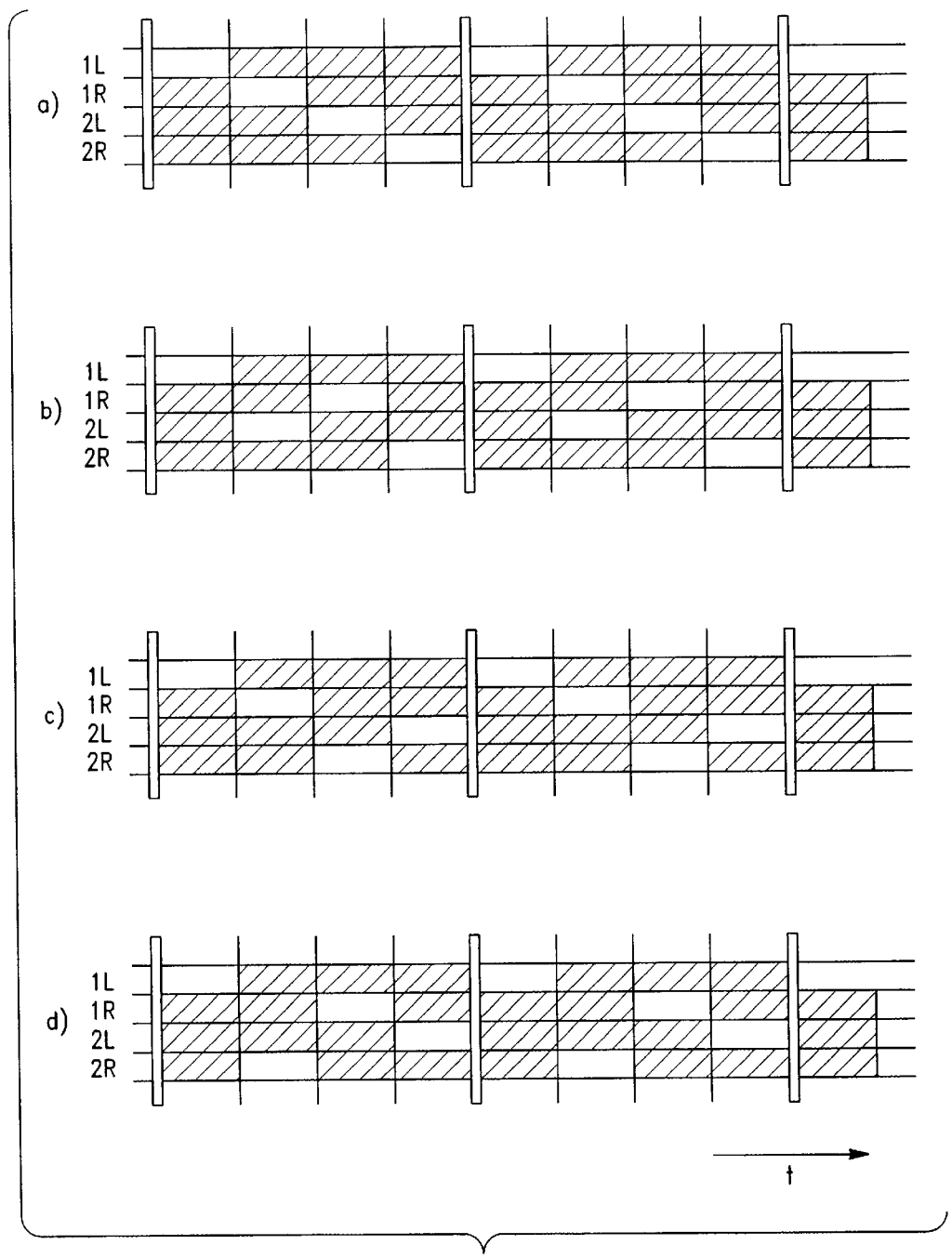
Figure 3:
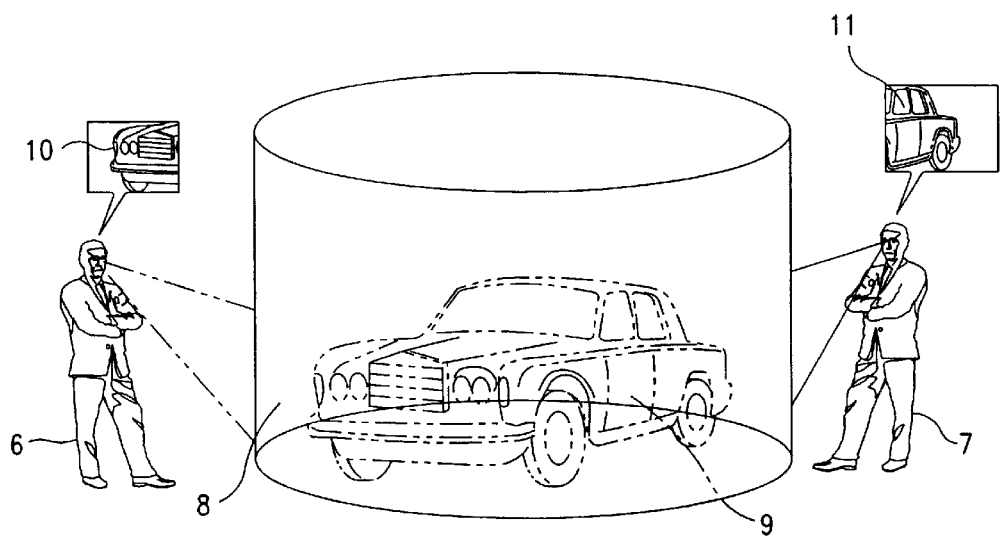
Figure 4:
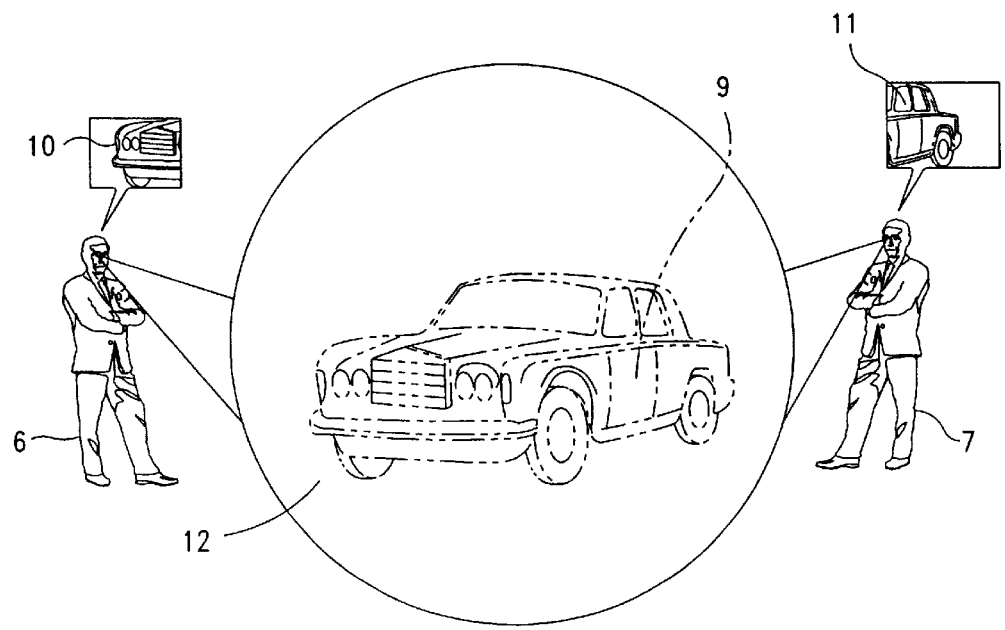

The invention is explained in more detail below using an exemplary embodiment of it. The figures show the following:

FIG. 1 a general view of a projection device with which shutter-lens spectacles are used, FIGS. 2a–d a listing of different display sequences for two viewers, FIG. 3 a cylindrical projection device containing the representation of a virtual object, and FIG. 4 a spherical projection device with a virtual object represented in its interior.

FIG. 1 shows a computer 1 which is connected with a projector 5 and/or a monitor 4 and transmits video signals to them. The computer also sends a control signal to an infra-red transmitter 2 which sends infra-red signals to the receiver that is located in the shutter-lens spectacles 3. The computer 1 is gated in such a way that images are displayed sequentially on the monitor 4 or the projection device 5; these images can be viewed with the shutter-lens spectacles 3 which are switched over in the appropriate rhythm by the infra-red gating so that a stereoscopic image appears for the viewer.

The fundamental principle of the gating of the displays by means of projectors 5 or monitors 4 and of the switching of the shutter-lens spectacles 3 is the same whether there is one or several viewers. When a single image is shown for several viewers, a correspondingly increased number of shutter-lens spectacles is used. When the device shown in FIG. 1 is employed for the simultaneous display of different stereoscopic images for a number of viewers, the computer 1 must be gated in such a manner that the sequence of the different images is correctly transmitted to the viewers to which they are assigned.

FIG. 2 shows four alternative possibilities of the sequential stereoscopic display of different images for two viewers. The abbreviations appearing in the left column mean: 1L=left eye of viewer 1; 1R=right eye of viewer 1; 2L=left eye of viewer 2; 2R=right eye of viewer 2.

FIG. 2a shows the display sequence 1L, 1R, 2L, 2R, which is repeated in every period of the clock-pulse frequency. FIG. 2b shows the sequence 1L, 2L, 1R, 2R. FIG. 2c shows the sequence 1L, 1R, 2R, 2L, while FIG. 2d shows the sequence 1L, 2R, 1R, 2L. The image sequences of FIGS. 2b and d have the advantage that, on the one hand, the viewer's subjective perception of flickering is reduced, since in these sequences the images succeed one another temporally in a more regular manner in comparison to the sequences of FIGS. 2a and c, and, on the other hand, the crosstalk between the left and the right image is considerably reduced owing to the temporal interval [between them]. When, in addition, the images for the first and the second viewer differ only slightly, then the crosstalk between the viewers' images is also relatively slight.

Although flickering is heightened by the procedure provided for by the invention when it is a matter of a stereoscopic representation, in comparison to a single image, this effect can be diminished by increasing the clock-pulse frequency of the display, for example to 160–180 Hz. The limit to which that frequency can be increased is determined solely by the maximum switching rate of the shutter-lens spectacles.

To double the number of viewers and of the simultaneous images, the shutter-lens spectacles and the projection devices can additionally be provided with polarization filters that are either polarized linearly in different directions or circularly polarized. The light attenuation occurring because polarization filters are used can be compensated for by increasing the projectors' light intensity, by employing several projectors for each viewer and/or each polarization orientation, or even by using many projectors for each individual image of a single eye [assigned to a single eye?].

Although the discussion of this exemplary embodiment treats of only two or four viewers, the number of viewers who view the same image at a particular time is, of course, not limited to two or four, but may be as many as desired.

FIG. 3 shows a projection assembly which includes a cylindrical video screen 8 which is equipped with a suitable panoramic projection device in its interior. Two viewers 6 and 7 are located outside the projection screen. The projector or the projectors cast a virtual image from the assembly's interior onto the projection surface. The figure shows the virtual image 9 of an automobile. For two viewers, two representations are required which can be separated from one another by means of appropriate polarization filters or by shutter configurations. When a polarization device is used, the first projector casts an image in the first polarization orientation onto the projection screen, while the second projector is equipped with a second polarization device which provides, preferably, a polarization orientation that is perpendicular to the first polarization orientation. If the two viewers are wearing appropriate polarization-lens spectacles, the images cast onto the cylindrical screen by the projectors can be made available to the viewers separately. Thus, at a given time, the two viewers 6 and 8 see only the image assigned to them. For example, the viewer 8 sees detail 10, whereas the viewer 7 sees detail 11 of the virtual image 9.

Unless additional measures are taken, the viewers are only able to perceive two different images. However, if a tracking system of the familiar kind is used, the images can be calculated and tracked by means of a computer in such a way that when the viewers 6 and 7 move in a circle around the cylindrical projection screen, the images are continually calculated afresh, so that the object 9 appears as virtually stationary, while the viewer moves around the projection screen. The viewer then experiences the illusion that he is able to regard the object from all sides. If a sufficiently fast computer is employed to continually provide newly calculated images that are a function of the viewer's standpoint at any given time, the virtual object appears to the viewer as a real object that can be regarded from different sides.

FIG. 4 shows a spherical projection assembly 12 that also makes it possible to view the virtual image 9 within the interior of the projection surface. In the case of this kind of projection assembly, in addition to the kind of image provided by the projection assembly shown in FIG. 3, a view from above and from below is also possible, so that the virtual object can be apprehended in the totality of its aspects.

The illusion of a virtual object is significantly enhanced if the virtual image is displayed as a stereoscopic representation. The viewers must then wear image separators in order to be able to coordinate with each of the viewer's eyes the stereoscopic image assigned to that particular eye. The image separators are either shutter-lens configurations or polarization devices. The result is that the image does not appear to the viewers as only displayed on a flat surface, but instead appears virtually in space. It is possible to define the stereoscopic perspective through appropriate adjustment of the individual images in such a fashion that the objects being viewed appear to the viewers as detached from the plane of the projection surface. A visual experience is thereby produced that approximates a holographic representation.

With the aid of the procedure provided for by the invention it is thus possible to provide completely different 3D images on a canvas projection screen or a video screen for two or more viewers. This is very advantageous especially for visual representations of work operations for instructional purposes.

What is claimed is:

1. A system for projecting non-holographic 3D images of an object onto a 2D viewing device and which permits a plurality of viewers to simultaneously view different aspects of the object displayed on the viewing device in accordance with their respective position from the viewing device, the system comprising:

a viewing device;

sensor means assigned to each viewer for ascertaining the assigned viewer position relative to said viewing device;

a display source for displaying a plurality of different 3D images simultaneously onto said viewing device for the purpose of simultaneous perception by each viewer;

means responsive to said sensor means for coordinating the simultaneously displayed images with each viewer's position at any given time; and image-separating means for separating said plurality of displayed 3D images into respective viewer assigned images that are viewable only by an assigned viewer in accordance with their position, and wherein different pictorial representations are displayed by a single projection device which projects the representations sequentially.

2. A system in accordance with claim 1, wherein said viewing device is selected from the display group consisting of a cathode-ray tube and an LC display.

3. A system for projecting non-holographic 3D images of an object onto a 2D viewing device and which permits a plurality of viewers to simultaneously view different aspects of the object displayed on the viewing device in accordance with their respective position from the viewing device, the system comprising:

a viewing device;

sensor means assigned to each viewer for ascertaining the assigned viewer position relative to said viewing device;

a display source for displaying a plurality of different 3D images simultaneously onto said viewing device for the purpose of simultaneous perception by each viewer;

means responsive to said sensor means for coordinating the simultaneously displayed images with each viewer's position at any given time;

image-separating means for separating said plurality of displayed 3D images into respective viewer assigned images that are viewable only by an assigned viewer in accordance with their position, wherein:

said plurality of 3D images are displayed sequentially; and said image-separating means comprise shutter-lens spectacles having lenses synchronized with said plurality of 3D images.

4. A system in accordance with claim 3, wherein:

said plurality of 3D images include left and right eye images for stereoscopic viewing of the object; and said system further includes image separators for separating the left and right eye images for each viewer.

5. A system in accordance with claim 3, wherein a length of time in which the shutter-lens spectacles are switched is shortened in proportion to the number of viewers to minimize image flickering.

6. A system in accordance with claim 5, wherein a clock pulse frequency of an image is increased in proportion to the number of viewers using the system.

7. A system in accordance with claim 5, wherein an object is being represented for two viewers and a pictorial representation of said object takes place in one of the following sequences:

| a) | left eye | viewer 1 |
| | right eye | viewer 1 |
| | left eye | viewer 2 |
| | right eye | viewer 2 |
| b) | left eye | viewer 1 |
| | left eye | viewer 2 |
| | right eye | viewer 1 |
| | right eye | viewer 2 |
| c) | left eye | viewer 1 |
| | right eye | viewer 1 |
| | right eye | viewer 2 |
| | left eye | viewer 2 |
| d) | left eye | viewer 1 |
| | right eye | viewer 2 |
| | right eye | viewer 1 |
| | left eye | viewer 2. |

8. A system in accordance with claim 6, wherein an object is being represented for two viewers and a pictorial representation of said object takes place in one of the following sequences:

| a) | left eye | viewer 1 |
| | right eye | viewer 1 |
| | left eye | viewer 2 |
| | right eye | viewer 2 |
| b) | left eye | viewer 1 |
| | left eye | viewer 2 |
| | right eye | viewer 1 |
| | right eye | viewer 2 |
| c) | left eye | viewer 1 |
| | right eye | viewer 1 |
| | right eye | viewer 2 |
| | left eye | viewer 2 |
| d) | left eye | viewer 1 |
| | right eye | viewer 2 |
| | right eye | viewer 1 |
| | left eye | viewer 2. |

9. A system in accordance with claim 4, wherein:

said image separators comprise polarization configurations; and said image-separating means comprise shutter-lens configurations.

10. A system in accordance with claim 4, wherein said image separators comprise shutter-lens configurations; and said image-separating means comprise polarization configurations.

11. A system in accordance with claim 3, wherein said viewing device is selected from the display group consisting of a cathode-ray tube and an LC display.

12. A system for projecting non-holographic 3D images of an object onto a 2D viewing device and which permits a plurality of viewers to simultaneously view different aspects of the object displayed on the viewing device in accordance with their respective position from the viewing device, the system comprising:

a viewing device;

sensor means assigned to each viewer for ascertaining the assigned viewer position relative to said viewing device;

a display source for displaying a plurality of different 3D images simultaneously onto said viewing device for the purpose of simultaneous perception by each viewer;

means responsive to said sensor means for coordinating the simultaneously displayed images with each viewer's position at any given time;

image-separating means for separating said plurality of displayed 3D images into respective viewer assigned images that are viewable only by an assigned viewer in accordance with their position; and wherein said image-separating means comprise polarization lenses which permit passage of the 3D images corresponding to polarization orientation and viewpoint of a particular viewer.

13. A system in accordance with claim 12, wherein said viewing device is a projection screen.

14. A system in accordance with claim 12, wherein said viewing device includes a cylindrical projection screen and images are projected onto a surface of said cylindrical projection screen from inside said cylindrical projection screen.

15. A system in accordance with claim 12, wherein said viewing device includes a spherical projection screen and images are projected onto a surface of said spherical projection screen from inside said spherical projection screen.

16. A system in accordance with claim 13, wherein different pictorial representations are displayed by a single projection device which projects the representations sequentially.

17. A system in accordance with claim 14, wherein different pictorial representations are displayed by a single projection device which projects the representations sequentially.

18. A system in accordance with claim 15, wherein different pictorial representations are displayed by a single projection device which projects the representations sequentially.

19. A system in accordance with claim 13, wherein a projection device is assigned to each polarization orientation of said shutter-lens spectacles.

20. A system in accordance with claim 14, wherein a projection device is assigned to each polarization orientation of said shutter-lens spectacles.

21. A system in accordance with claim 15, wherein a projection device is assigned to each polarization orientation of said shutter-lens spectacles.

22. A system in accordance with claim 12, wherein:

said plurality of 3D images include left and right eye images for stereoscopic viewing of the object; and said system further includes image separators for separating the left and right eye images for each viewer.

23. A system in accordance with claim 22, wherein:

said image separators comprise polarization configurations; and said image-separating means comprise shutter-lens configurations.

24. A system in accordance with claim 22, wherein said image separators comprise shutter-lens configurations; and said image-separating means comprise polarization configurations.

* * * * *